United States Patent [19]

Omura et al.

[11] Patent Number: 4,663,440

[45] Date of Patent: May 5, 1987

[54] BISAZO BROWN REACTIVE DYE

[75] Inventors: Takashi Omura, Ashiya; Masaki Sunami, Toyonaka; Yasuo Tezuka, Ibaraki, all of Japan

[73] Assignee: Sumitomo Chemical Company, Limited, Osaka, Japan

[21] Appl. No.: 266,642

[22] Filed: May 26, 1981

[30] Foreign Application Priority Data

Jun. 4, 1980 [JP] Japan .................................. 55-75994
Jan. 21, 1981 [JP] Japan .................................. 56-8314

[51] Int. Cl.$^4$ .................... C09B 62/09; C09B 62/533; D06P 1/382; D06P 1/384
[52] U.S. Cl. ..................................... 534/637; 534/582; 534/598; 534/617; 534/642; 534/829; 534/832; 534/833; 534/840; 534/850; 534/856; 534/881
[58] Field of Search ................. 260/153; 534/617, 637, 534/642

[56] References Cited

U.S. PATENT DOCUMENTS

| | | | |
|---|---|---|---|
| 3,316,239 | 4/1967 | Riat et al. ................................ | 260/163 |
| 3,429,870 | 2/1969 | Carati et al. ........................... | 260/153 |
| 3,627,749 | 12/1971 | Ackermann ........................... | 534/638 |
| 3,843,623 | 10/1974 | Siegel ..................................... | 260/153 |

FOREIGN PATENT DOCUMENTS

| | | | |
|---|---|---|---|
| 0021105 | 6/1979 | European Pat. Off. ............ | 260/153 |
| 2109879 | 10/1971 | Fed. Rep. of Germany ...... | 260/153 |
| 1102204 | 2/1968 | United Kingdom ................ | 260/153 |
| 50-178 | 6/1975 | United Kingdom ................ | 260/153 |
| 2026527 | 6/1979 | United Kingdom ................ | 26/153 |

Primary Examiner—Floyd D. Higel

Attorney, Agent, or Firm—Stevens, Davis, Miller & Mosher

[57] ABSTRACT

A brown reactive dye represented by a free acid of the formula,

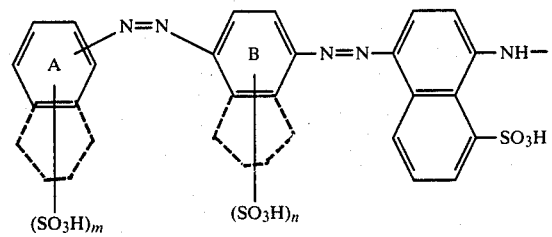

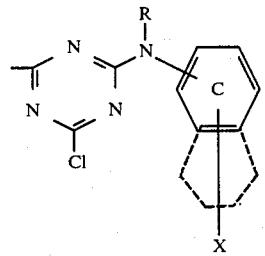

wherein R is a hydrogen atom or a $C_1$ to $C_4$ alkyl group, X is $-SO_2CH_2CH_2Cl$, $-SO_2CH=CH_2$, $-SO_2CH_2CH_2OSO_3H$ or $-SO_2CH_2CH_2OPO_3H_2$, rings A, B and C are each a benzene or naphthalene ring which may have other substituent, m is 0 to 3 and n is 0 to 1.

This dye is suitable for dyeing cellulose fibers brown to afford dyeings superior in fastnesses, acid stability, build-up property and level dyeing property.

2 Claims, No Drawings

BISAZO BROWN REACTIVE DYE

The present invention relates to reactive dyes capable of dyeing cellulosic fibers a brown color with good build-up property and excellent fastnesses.

It is well known that dyes having a β-sulfatoethylsulfonyl group are used to dye cellulose materials as the so-called vinylsulfone type reactive dyes. However, there have never been known azo brown reactive dyes of this kind capable of giving dyeings superior in build-up property and various fastnesses, particularly chlorine fastness and acid stability. This has frequently become a problem in the field of ground dyeing in accordance with dip dyeing. Consequently, there is a strong demand for the development of brown reactive dyes superior in chlorine fastness, acid stability and build-up property.

There are also well known brown azo dyes having a monochlorotriazinyl group as a reactive group. But, these reactive dyes usually requires relatively high dyeing temperatures, and are not suitable for exhaustion dyeing but only for printing, and gives dyeings unfavorable in acid stability.

Dyes of the following formulae disclosed in Published Examined Japanese Patent Application No. 9971/1961 are unsatisfactory in chlorine fastness:

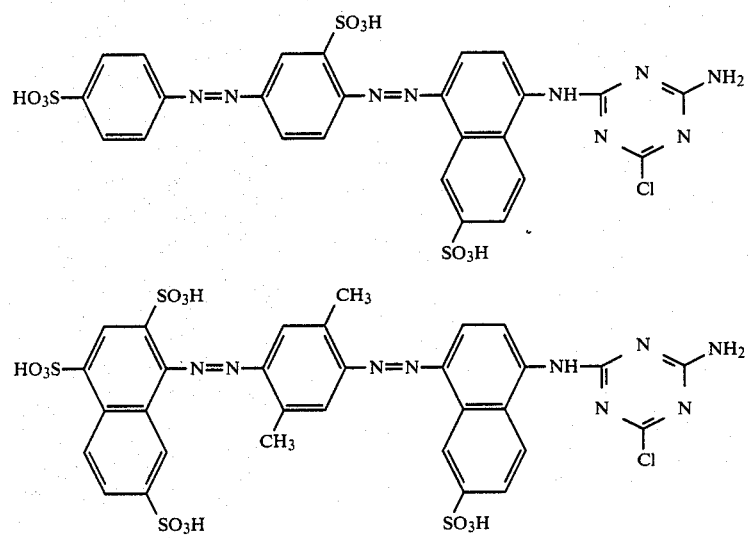

Further, a dye of the following formula disclosed in Published Examined Japanese Patent Application No. 32588/1971 is unsatisfactory in acid stability:

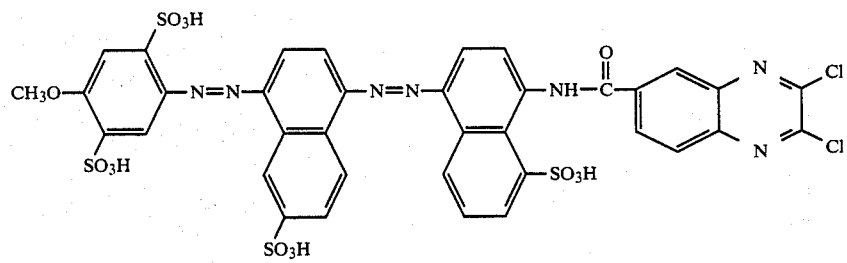

Under such circumstances, the present inventors have been concerned with developing a brown reactive dye capable of producing dyeings superior in fastnesses, acid stability and build-up property. As a result, it was found that a particular brown disazo dye having both β-sulfatoethylsulfonyl group and monochlorotriazinyl group as reactive groups is capable of producing dyeings having combined excellent fastnesses, acid stability and build-up property, and can solve the drawbacks of the foregoing reactive dyes having a monochlorotriazinyl group and dichloroquinoxaline group.

The present invention provides a compound represented by a free acid of the formula (I),

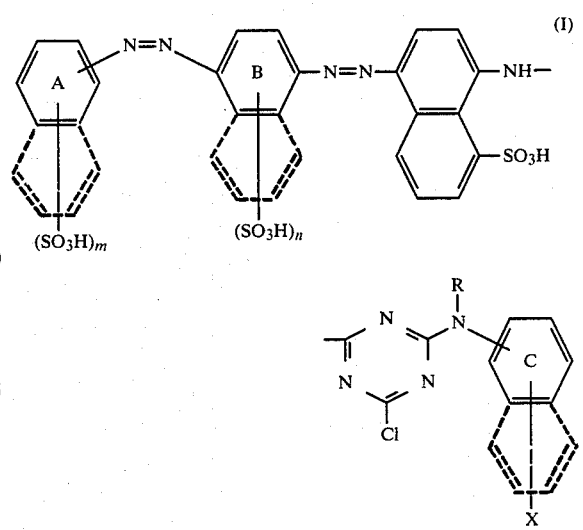

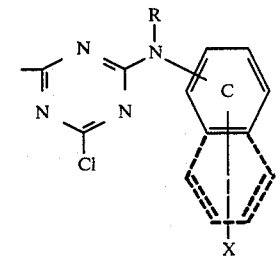

wherein R is a hydrogen atom or a $C_1$ to $C_4$ alkyl group, X is $-SO_2CH_2CH_2Cl$, $-SO_2CH=CH_2$, $-SO_2CH_2$-

In the present invention, preferred is a compound represented by a free acid of the formula,

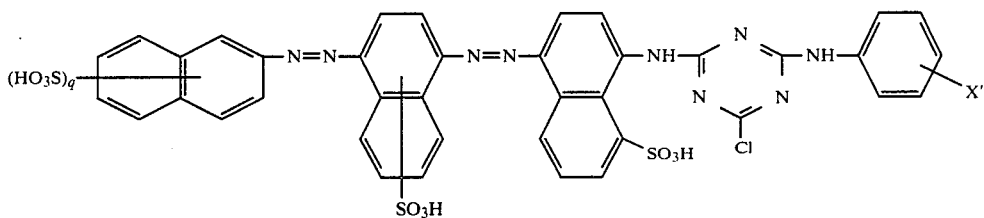

$H_2OSO_3H$ or $-SO_2CH_2CH_2OPO_3H_2$, rings A, B and C are each a benzene or naphthalene ring which may have other substituent, m is 0 to 3 and n is 0 to 1.

The present invention also provides a process for producing the compound of the formula (I), which comprises condensing a disazo compound of the formula,

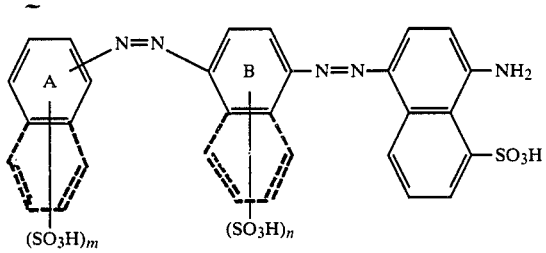

wherein the rings A and B, m and n are as defined above, and an amine of the formula,

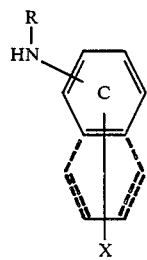

wherein the ring C, R and X are as defined above, with cyanuric chloride in an optional order.

Examples of the $C_1$ to $C_4$ alkyl group expressed by R, a substituent in the formula (I), are methyl, ethyl, n-propyl, iso-propyl, n-butyl, iso-butyl, sec-butyl and tert-butyl groups. When the ring C is a naphthalene ring connected to a s-triazine ring through an —NR— group, the —NR— group may be located at the Γ- or β-position. In addition to a group X, the ring C may have a substituent, such as for example a $C_1$ to $C_4$ alkyl or $C_1$ to $C_4$ alkoxy group, a fluorine, chlorine or bromine atom, or a nitro, hydroxy, carboxylic acid or sulfonic acid group.

R in the formula (I) is particularly preferably a hydrogen atom and a methyl or ethyl group.

As the substituent other than a sulfonic acid group of the ring B in the formula (I), there are given amino, acetylamino, ureido, methyl, ethyl and methoxy groups.

As the substituent other than a sulfonic acid group of the ring A in the formula (I), there are given carboxylic acid, methyl, methoxy and nitro groups, a chlorine atom, acetylamino and ureido groups.

wherein X' is $-SO_2CH=CH_2$, $-SO_2CH_2CH_2OSO_3H$ or $-SO_2CH_2CH_2OPO_3H_2$, and q is 1 to 3.

The compound of the formula (I) can be produced as follows: A monoazo compound of the formula (II),

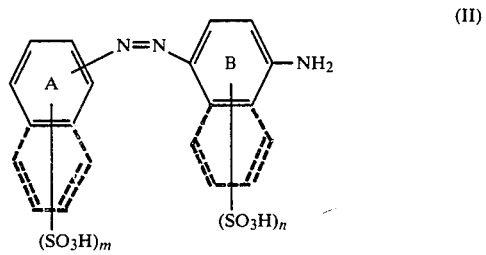

wherein the rings A and B, m and n are as defined above, is diazotized and coupled with 1-aminonaphthalene-8-sulfonic acid to obtain a disazo compound of the formula,

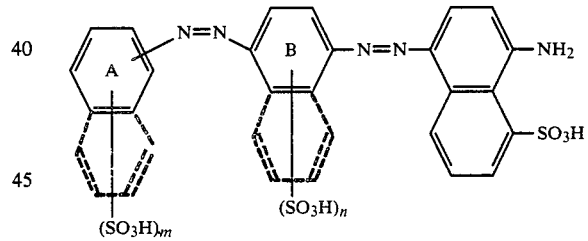

wherein the rings A and B, m and n are as defined above and the disazo compound and an amine of the formula (III),

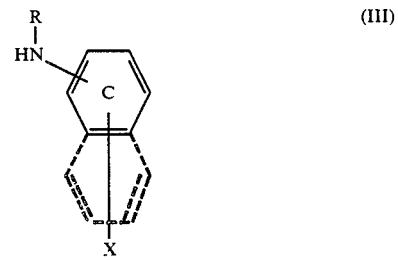

wherein the ring C, R and X are as defined above, are condensed with cyanuric chloride in an optional order to obtain the desired compound (I).

The compound of the formula (II) can be produced by diazotizing an amine of the formula (IV),

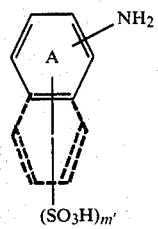

wherein the ring A is as defined above, and m' is 0 to 3, and coupling the resulting diazotized compound with a compound of the formula (V),

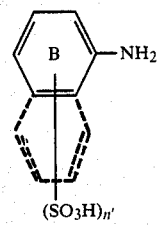

wherein the ring B is as defined above, and n' is 0 to 1, followed by sulfonation if necessary.

As the amine of the formula (III) usable in the present invention, the following compounds are given:
1-Aminobenzene-2-, -3- or -4-β-sulfatoethylsulfone,
1-aminobenzene-3-β-phosphatoethylsulfone,
1-amino-4-methylbenzene-3-β-sulfatoethylsulfone,
1-aminobenzene-3-β-chloroethylsulfone,
1-amino-4-methoxybenzene-3-β-sulfatoethylsulfone,
1-aminobenzene-4-β-sulfatoethylsulfone-2-sulfonic acid,
1-aminobenzene-5-β-sulfatoethylsulfone-2-sulfonic acid,
1-aminobenzene-5-β-sulfatoethylsulfone-2,4-disulfonic acid,
1-aminonaphthalene-4-β-sulfatoethylsulfone,
1-amino-2,5-dimethoxybenzene-4-β-sulfatoethylsulfone,
1-aminobenzene-4-β-sulfatoethylsulfone-2-carboxylic acid,
1-aminobenzene-5-β-sulfatoethylsulfone-2-carboxylic acid,
1-amino-2-methoxybenzene-4-β-sulfatoethylsulfone,
1-amino-2-chlorobenzene-4-β-sulfatoethylsulfone,
1-amino-2-methoxybenzene-5-β-sulfatoethylsulfone,
2-aminonaphthalene-8-β-sulfatoethylsulfone,
2-aminonaphthalene-8-β-sulfatoethylsulfone-6-sulfonic acid,
1-amino-2,5-dimethoxybenzene-4-vinylsulfone,
1-amino-2-methoxy-5-methylbenzene-4-β-sulfatoethylsulfone,
1-amino-2,5-diethoxybenzene-4-β-sulfatoethylsulfone,
1-amino-2-bromobenzene-4-β-sulfatoethylsulfone,
1-amino-2-bromobenzene-4-vinylsulfone,
1-aminobenzene-5-vinylsulfone-2,4-disulfonic
1-aminobenzene-5-β-phosphatoethylsulfone-2,4-disulfonic acid,
1-aminobenzene-5-β-chloroethylsulfone-2,4-disulfonic acid,
2-aminonaphthalene-8-β-phosphatoethylsulfone-6-sulfonic acid,
2-aminonaphthalene-8-vinylsulfone-6-sulfonic acid,
1-amino-2-methoxy-5-methylbenzene-4-β-chloroethylsulfone,
2-aminophenol-4-β-sulfatoethylsulfone,
1-aminobenzene-3- or -4-vinylsulfone,
1-amino-2-hydroxybenzene-4-β-sulfatoethylsulfone,
1-aminobenzene-5-vinylsulfone-2-sulfonic acid.

As the compound of the formula (IV), the following are given:
Aniline, o-, m- or p-toluidine, 2,4- or 2,5-dimethylaniline,
5-methyl-2-methoxyaniline, o-, m- or p-chloroaniline,
aniline-2-, -3- or -4-sulfonic acid,
aniline-2,5-disulfonic acid, aniline-3,5-disulfonic acid,
aniline-2,4-disulfonic acid, 4- or 5-sulfoanthranilic acid,
2-nitroaniline-4-sulfonic acid, 4-nitroaniline-2-sulfonic acid,
3-nitroaniline-6-sulfonic acid,
5-nitro-2-aminoanisole-4-sulfonic acid,
2-methylaniline-4,5-disulfonic acid,
2,5-dichloroaniline-4-sulfonic acid,
4-methylaniline-2-sulfonic acid,
5-chloro-4-methylaniline-2-sulfonic acid,
4-methoxyaniline-2-sulfonic acid,
4-chloroaniline-3-sulfonic acid,
5-acetylaminoaniline-2,4-disulfonic acid,
anthranilic acid, 2-aminoterephthalic acid,
m-aminobenzoic acid, 3- or 4-aminophthalic acid,
p-aminobenzoic acid, 5-nitroanthranilic acid,
6-nitro-3-aminobenzoic acid, 5-nitro-2-aminoterephthalic acid,
1-naphthylamine-4-sulfonic acid,
2-naphthylamine-4,8-disulfonic acid,
6-nitro-2-naphthylamine-4,8-disulfonic acid,
2-naphthylamine-6,8-disulfonic acid,
2-naphthylamine-5,7-disulfonic acid,
3- or 4-acetylaminoaniline-6-sulfonic acid,
2-aminoanisole-4- or -5-sulfonic acid,
5-amino-2-hydroxybenzoic acid,
1-naphthylamine, 2-methoxy-1-naphthylamine,
1-naphtylamine-4-, -5-, -6- or -7-sulfonic acid,
2-naphthylamine-1-, -5-, -6-, -7- or -8-sulfonic acid,
1-naphtylamine-3,6-disulfonic acid,
2-naphthylamine-1,5-disulfonic acid,
2-naphtylamine-1,6-disulfonic acid,
6-acetylamino-2-naphthylamine-4,8-disulfonic acid,
2-naphthylamine-3,6,8-trisulfonic acid,
2-naphthylamine-4,6,8-trisulfonic acid,
1-naphthylamine-2,5,7-trisulfonic acid.

As the compound of the formula (V), the following ones are given:
Aniline, m-toluidine, o-toluidine, 2,5-dimethylaniline,
o-anisidine, m-anisidine, 2,5-dimethoxyaniline,
5-methyl-2-methoxyaniline, anthranilic acid,
4-methyl-2-aminobenzoic acid, 3-acetylaminoaniline,
m-ureidoaniline, 3-acetylamino-6-methylaniline,
3-acetylamino-6-methoxyaniline, 3-benzoylaminoaniline,
1-naphthylamine-6-sulfonic acid,
1-naphthylamine-7-sulfonic acid,
2-methoxy-1-naphthylamine-6-sulfonic acid.

As the compound of the formula (II) produced by the sulfonation of an aminoazo compound, the following are given:
4-Amino-3,4'-disulfo-1,1'-azobenzene and
2-(4'-amino-6'-methylphenylazo)naphthalene-3',4,8-trisulfonic acid.

A method of production will be illustrated in more detail. A compound of the formula (IV) is dissolved or suspended in water and diazotized with sodium nitrite at a temperature not more than 20° C. under acidic condition with a mineral acid. After decomposing excessive nitrous acid, the diazotized compound is coupled with a compound of the formula (V) at a temperature not more than 30° C. and at a pH of 3 to 7. After the diazo compound is no longer detectable, diazotization is again carried out at a temperature not more than 30° C. with sodium nitrite. After decomposing excessive nitrous acid, the diazotized compound is coupled with 1-aminonaphthalene-8-sulfonic acid at a temperature not more than 30° C. and at a pH of 3 to 7 to obtain an organic dye. The organic dye-containing mixture or the organic dye isolated by salting-out, is then subjected to subsequent condensation.

The organic dye and an amine of the formula (III) may be condensed with cyanuric chloride in an optional order. The first condensation with cyanuric chloride may be carried out at a temperature not more than 30° C. and at a pH of 2 to 8. The second condensation may be carried out at a temperature not more than 40° C. and at a pH of 3 to 8. After completion of the reaction, the resulting reaction mixture as it is, or the product isolated by salting-out is mixed with assistants such as a stabilizer, and dried to obtain the dye of the present invention.

The dyes of the present invention are capable of dyeing a wide range of hydroxyl group-containing substances, particularly natural or regenerated cellulose such as cotton and viscose rayon.

Dyeing may be carried out using the dyes of the present invention and an acid-binding agent such as sodium hydroxide, sodium carbonate, phosphates, silicates or sodium hydrogen carbonate. A method of dyeing may be selected depending upon the property and physical form of fibers, and for example, exhaustion dyeing, printing and continuous dyeing including cold-pad-batchup dyeing may be employed.

Exhaustion dyeing may be carried out at a relatively low temperature using a dye bath contianing the dye of the present invention and an acid-binding agent (e.g. sodium carbonate, trisodium phosphate, sodium hydroxide) as well as an electrolyte (e.g. sodium sulfate or sodium chloride).

Printing may be carried out by applying the dyes of the present invention onto fibers together with a thickening agent or emulsion thickening agent (e.g. sodium alginate, starch ether), an alkali or alkali-releasing agent (e.g. sodium carbonate, sodium hydrogen carbonate, sodium hydroxide, trisodium phosphate, sodium trichloroacetate, corresponding potassium or alkaline earth metal compounds) and if necessary a pringing assistant (e.g. urea) or dispersing agent, followed by drying and heat treatment, particularly preferably, in the presence of steam.

Cold pad batchup dyeing may be carried out by padding the dyes of the present invention onto cloth in the vicinity of room temperature together with an acid-binding agent (e.g. sodium hydroxide, a mixture of sodium hydroxide with sodium silicate, sodium carbonate or trisodium phosphate), if necessary sodium sulfate or sodium chloride, and as need arises, a dissolution assistant (e.g. urea) or penetrating agent, batching up the cloth on a roller, and allowing it to stant for at least 3 hours or over night, followed by washing with water and drying.

The dyes according to the present invention are capable of dyeing cellulosic fibers at a relatively low temperature with good fixation percentage. Dyeings obtained are superior in fastnesses to light, perspiration-light and chlorine, and have a good fastness to wet treatment such as washing as well as a particularly good fastness to acid bleeding. The dyes can therefore solve the drawbacks of conventional reactive dyes having a monochlorotriazinyl group. Further, in cheese dyeing, one kind of an exhaustion method, differences in color yield and shade between the inner and outer layers of a cheese easily appear with prior-art dyes, becoming a serious problem in dyeing factories. With the dyes according to the present invention, however, suitability for cheese dyeing is such that these problems can be solved. Further, the dyes according to the present invention can dye fiber materials deep and are superior in build-up property.

The present invention will be illustrated with reference to the following examples. All parts in the examples are by weight, unless otherwise specified.

EXAMPLE 1

To a mixture of 4-amino-3,4'-disulfo-1,1'-azobenzene (56.85 parts), ice water (284 parts) and hydrochloric acid (41 parts by volume) was added a 35% aqueous sodium nitrite solution (24.5 parts by volume) at a temperature not more than 15° C. to carry out diazotization. After decomposition of excessive nitrous acid with sulfamic acid, 1-aminonaphthalene-8-sulfonic acid (33.44 parts) was added to the diazo mixture, and the pH was adjusted to 4 to 5 with a 15% aqueous sodium carbonate solution. After the diazo compound disappeared, cyanuric chloride (29.34 parts) was added at 10° to 20° C., and the pH was kept at 6 to 7 for 3 hours using a 15% aqueous sodium carbonate solution. Thereafter, 1-aminobenzene-3-β-sulfatoethylsulfone (42.15 parts) was added, and the reaction solution was stirred at 10° to 20° C. for 5 hours while maintaining its pH at 4.5 to 5.5, salted out at 55° to 60° C. and filtered to obtain 119.7 parts of a dye (1):

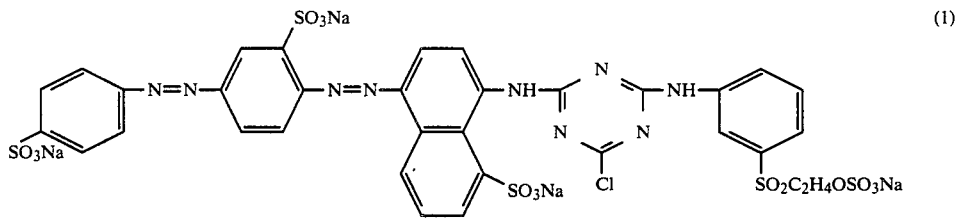

[λ$_{max}$=422 nm (in water); the same measurement condition was used in the following examples].

EXAMPLES 2 TO 5

Dyes were synthesized in the same manner as in Example 1 but using the following amines in place of 1-aminobenzene-3-β-sulfatoethylsulfone:

(2) 1-Aminobenzene-4-β-sulfatoethylsulfone,
(3) 1-aminobenzene-3-β-phosphatoethylsulfone,
(4) 1-amino-4-methoxybenzene-3-β-sulfatoethylsulfone,
(5) 1-amino-2-methoxybenzene-5-β-sulfatoethylsulfone.

EXAMPLES 6 TO 31

Procedure was carried out in the same manner as in Example 1 but using the compounds of the formulae (II) and (III) shown in the following table. The corresponding dyes (sodium salts) were thus obtained.

mine-7-sulfonic acid (11.15 parts) at a temperature not more than 15° C. and at a pH of 4 to 5. The product was then diazotized as usual and coupled with 1-naphthylamine-8-sulfonic acid (11.15 parts) at a temperature not more than 15° C. and at a pH of 4 to 5. After the diazo compound disappeared, cyanuric chloride (9.23 parts) was added at 10° to 20° C., and the pH was kept at 6 to 7 for 3 hours using a 15% aqueous sodium carbonate solution. Thereafter, 1-aminobenzene-3-β-sulfatoethylsulfone (14.05 parts) was added, and the reaction solu-

| No. | Formula (II) Amine (IV) → Compound (V) | Formula (III) (Amine) | Shade on cellulose |
|---|---|---|---|
| 6 | 1-Naphthylamine-2,5,7-trisulfonic acid → 2,5-dimethylaniline | 1-Aminobenzene-3-β-sulfatoethylsulfone | Brown |
| 7 | 2-Naphthylamine-3,6-disulfonic acid → 3-acetylaminoaniline | 1-Aminobenzene-3-β-sulfatoethylsulfone | Brown |
| 8 | 2-Naphthylamine-3,6,8-trisulfonic acid → 3-acetylaminoaniline | 1-Aminobenzene-3-β-sulfatoethylsulfone | Brown |
| 9 | Aniline-2,5-disulfonic acid → m-ureidoaniline | 1-Amino-4-methoxybenzene-3-β-sulfatoethylsulfone | Yellowish brown |
| 10 | Aniline-2,5-disulfonic acid → 1-naphthylamine-6-sulfonic acid | 1-Aminobenzene-3-β-sulfatoethylsulfone | Reddish brown |
| 11 | 2-Naphthylamine-4,8-disulfonic acid → 1-naphthylamine-6-sulfonic acid | 1-Aminobenzene-3-β-sulfatoethylsulfone | Reddish brown |
| 12 | 2-Naphthylamine-3,6,8-trisulfonic acid → 1-naphthylamine-6-sulfonic acid | 1-Aminobenzene-3-β-sulfatoethylsulfone | Reddish brown |
| 13 | 2-Naphthylamine-3,6-disulfonic acid → m-ureidoaniline | 1-Aminobenzene-3-β-sulfatoethylsulfone | Brown |
| 14 | 2-Naphthylamine-3,6,8-trisulfonic acid → m-ureidoaniline | 1-Aminobenzene-3-β-sulfatoethylsulfone | Brown |
| 15 | Aniline-2,5-disulfonic acid → 2,5-dimethylaniline | 1-Aminobenzene-4-β-sulfatoethylsulfone | Yellowish brown |
| 16 | 2-Naphthylamine-6,8-disulfonic acid → 1-naphthylamine-6-sulfonic acid | 1-Aminobenzene-4-β-sulfatoethylsulfone | Brown |
| 17 | 1-Naphthylamine-2,5,7-trisulfonic acid → 1-naphthylamine-6-sulfonic acid | 1-Aminobenzene-3-β-sulfatoethylsulfone | Reddish |
| 18 | 1-Naphthylamine-2,5,7-trisulfonic acid → 5-methyl-2-methoxyaniline | 1-Aminobenzene-3-β-sulfatoethylsulfone | Brown |
| 19 | Aniline-2,4-disulfonic acid → m-toluidine | 1-Aminobenzene-3-β-sulfatoethylsulfone | Yellowish Brown |
| 20 | 2-Naphthylamine-4,8-disulfonic acid → m-ureidoaniline | 1-Aminobenzene-3-β-sulfatoethylsulfone | Reddish Brown |
| 21 | 2-Naphthylamine-4,8-disulfonic acid → 5-methyl-2-methoxyaniline | 1-Aminobenzene-3-β-sulfatoethylsulfone | Reddish Brown |
| 22 | 2-Naphthylamine-3,6,8-trisulfonic acid → 5-methyl-2-methoxyaniline | 1-Aminobenzene-3-β-sulfatoethylsulfone | Reddish Brown |
| 23 | 2-Naphthylamine-3,6,8-trisulfonic acid → m-toluidine | 1-Aminobenzene-3-β-sulfatoethylsulfone | Reddish Brown |
| 24 | 2-Naphthylamine-3,6,8-trisulfonic acid → m-anisidine | 1-Aminobenzene-3-β-sulfatoethylsulfone | Reddish Brown |
| 25 | 2-Naphthylamine-4,8-disulfonic acid → m-toluidine | 1-Aminobenzene-3-β-sulfatoethylsulfone | Reddish brown |
| 26 | 2-Naphthylamine-4,8-disulfonic acid → 3-acetylamino-6-methoxyaniline | 1-Aminobenzene-3-β-sulfatoethylsulfone | Reddish brown |
| 27 | 2-Naphthylamine-4,8-disulfonic acid → 2,5-dimethoxyaniline | 1-Aminobenzene-3-β-sulfatoethylsulfone | Reddish brown |
| 28 | 2-Naphthylamine-4,8-disulfonic acid → 3-acetylaminoaniline | 1-Aminobenzene-3-β-sulfatoethylsulfone | Reddish brown |
| 29 | 2-Naphthylamine-3,6-disulfonic acid → 5-methyl-2-methoxyaniline | 1-Aminobenzene-3-β-sulfatoethylsulfone | Reddish brown |
| 30 | 2-Naphthylamine-1,5-disulfonic acid → m-ureidoaniline | 1-Aminobenzene-3-β-sulfatoethylsulfone | Reddish brown |
| 31 | 2-Naphthylamine-1,5-disulfonic acid → 3-acethylamino-5-methoxyaniline | 1-Aminobenzene-3-β-sulfatoethylsulfone | Reddish brown |

EXAMPLES 32

2-Naphthylamine-4,8-disulfonic acid (15.17 Parts) was diazotized as usual and coupled with 1-naphthylation was stirred at 10° to 20° C. for 5 hours while maintaining the pH at 4.5 to 5.5, and salted out at 55° to 60° C. The precipitate was collected by filtration and dried to obtain a dye of the formula (32):

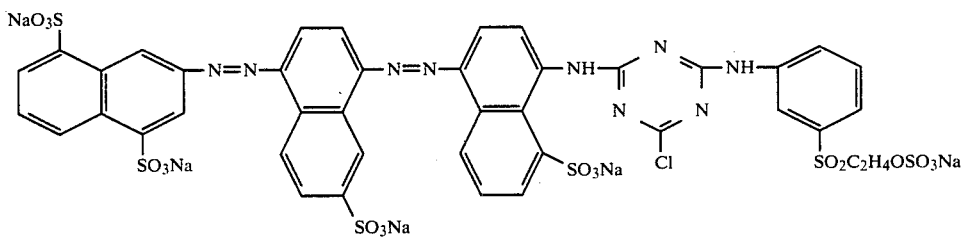

(32)

($\lambda_{max}$ 500 nm).

EXAMPLES 33 TO 50

Procedure was carried out in the same manner as in Example 32 but using the compounds of the formulae (III) and (IV) shown in the following table and as the compound of the formula (V), 1-naphthylamine-7-sulfonic acid. The corresponding dyes (sodium salt) were thus obtained.

In the same manner as above, dyeing was carried out using the dyes (2) to (31) to obtain brown dyeings having good fastnesses acid stability, and level dyeing and build-up properties in any case.

EXAMPLE 52

The dye (0.3 part) obtained in Example 32 was dissolved in water (200 parts), and sodium sulfate (20 parts) was added to prepare a dye bath. Thereafter, cotton (10

| No. | Amine (IV) | Amine (III) | Shade on cellulose |
|---|---|---|---|
| 33 | 2-Naphthylamine-4,8-disulfonic acid | 1-Aminobenzene-4-$\beta$-sulfatoethylsulfone | Reddish brown |
| 34 | 2-Naphthylamine-4,8-disulfonic acid | 1-Aminobenzene-3-$\beta$-phosphatoethylsulfone | Reddish brown |
| 35 | 2-Naphthylamine-4,8-disulfonic acid | 1-Amino-4-methoxybenzene-3-$\beta$-sulfatoethylsulfone | Reddish brown |
| 36 | 2-Naphthylamine-4,8-disulfonic acid | 1-Amino-2-methoxybenzene-5-$\beta$-sulfatoethylsulfone | Reddish brown |
| 37 | 2-Naphthylamine-5,7-disulfonic acid | 1-Aminobenzene-3-$\beta$-sulfatoethylsulfone | Yellowish red-brown |
| 38 | 2-Naphthylamine-5,7-disulfonic acid | 1-Aminobenzene-4-$\beta$-sulfatoethylsulfone | Yellowish red-brown |
| 39 | 2-Naphthylamine-5,7-disulfonic acid | 1-Amino-4-methoxybenzene-3-$\beta$-sulfatoethylsulfone | Yellowish red-brown |
| 40 | 2-Naphthylamine-6,8-disulfonic acid | 1-Amino-4-methoxybenzene-3-$\beta$-sulfatoethylsulfone | Yellowish red-brown |
| 41 | 2-Naphthylamine-6,8-disulfonic acid | 1-Aminobenzene-4-$\beta$-sulfatoethylsulfone | Yellowish red-brown |
| 42 | 2-Naphthylamine-6,8-disulfonic acid | 1-Aminobenzene-3-$\beta$-sulfatoethylsulfone | Yellowish red-brown |
| 43 | 2-Naphthylamine-1,5-disulfonic acid | 1-Aminobenzene-3-$\beta$-sulfatoethylsulfone | Reddish yellow-brown |
| 44 | 1-Naphthylamine-3,6-disulfonic acid | 1-Aminobenzene-3-$\beta$-sulfatoethylsulfone | Reddish yellow-brown |
| 45 | 1-Naphthylamine-5-sulfonic acid | 1-Aminobenzene-3-$\beta$-sulfatoethylsulfone | Reddish brown |
| 46 | 2-Naphthylamine-3,6,8-trisulfonic acid | 1-Aminobenzene-3-$\beta$-sulfatoethylsulfone | Yellowish red-brown |
| 47 | 1-Naphthylamine-2,5,7-trisulfonic acid | 1-Aminobenzene-3-$\beta$-sulfatoethylsulfone | Yellowish brown |
| 48 | 2-Naphthylamine-4,8-disulfonic acid | 2-Aminonaphthalene-8-$\beta$-sulfatoethylsulfone-6-sulfonic acid | Reddish brown |
| 49 | 2-Naphthylamine-5,7-disulfonic acid | 2-Aminonaphthalene-8-$\beta$-sulfatoethylsulfone-6-sulfonic acid | Reddish brown |
| 50 | 2-Naphthylamine-6,8-disulfonic acid | 2-Aminonaphthalene-8-$\beta$-sulfatoethylsulfone-6-sulfonic acid | Reddish brown |

EXAMPLE 51

The dye (0.3 part) obtained in Example 1 was dissolved in water (200 parts), and sodium sulfate (20 parts) was added to prepare a dye bath. Thereafter, cotton (10 parts) was put in the dye bath which was then heated to 50° C. 30 Minutes thereafter, sodium carbonate (4 parts) was added, and dyeing was carried out at the same temperature for 1 hour. After completion of the dyeing, the cotton was rinsed with water and soaped to obtain brown dyeings having good fastnesses such as light, light-perspiration and chlorine fastnesses.

parts) was put in the dye bath which was then heated to 50° C. 30 Minutes thereafter, sodium carbonate (4 parts) was added, and dyeing was carried out at the same temperature for 1 hour. After completion of the dyeing, the cotton was rinsed with water and soaped to obtain brown dyeings having good fastnesses and excellent build-up property.

In the same manner as above, dyeing was carried out using the dyes (33) to (50) to obtain brown dyeings having good fastnesses, acid stability, and excellent level dyeing and build-up properties in any case.

What is claimed is:

1. A compound represented by a free acid of the formula,
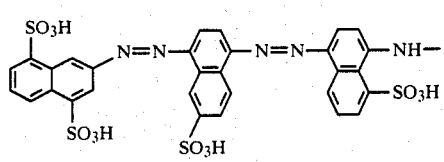
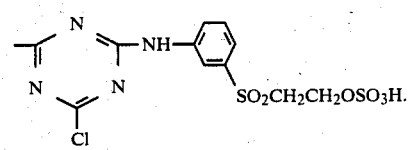
2. A compound represented by a free acid of the formula,
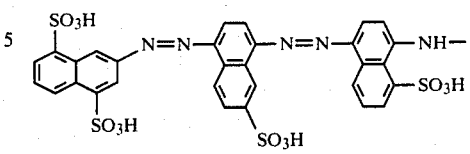
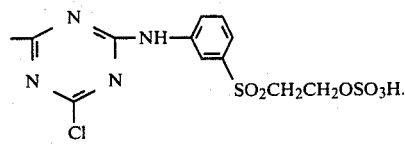
* * * * *